Patented Mar. 22, 1949

2,465,089

UNITED STATES PATENT OFFICE 2,465,089

SULFONATED ARYL-THIO-ETHERS OF PHTHALOCYANINES AND PROCESS FOR THEIR MANUFACTURE

Ernst Gutzwiller, Basel, Switzerland, assignor to Sandoz Limited, Basel, Switzerland No Drawing. Application July 23, 1947, Serial No. 763,142. In Switzerland August 1, 1946

12 Claims. (Cl. 260—314.5)

The present invention relates to new water-soluble dyestuffs and dyestuff intermediates of the phthalocyanine series, which dye cellulosic fibers in bluish-green to yellowish-green shades, and to a process for the manufacture of these dyestuffs.

I have found that the condensation products prepared by treating halogenophthalocyanines with aromatic mercapto compounds in the manner disclosed in my U. S. Patent No. 2,456,274, granted December 14, 1948, on application Ser. No. 583,008, filed on March 15, 1945, and which are presumed to be thioethers of phthalocyanines, can be transformed into water-soluble compounds by treating them with sulfonating agents. The final sulfonation products obtained according to my present invention are easily soluble in water and can be used for the dyeing of paper, cotton, silk and the like and are intermediates for the manufacture of pigments. The shades obtained with these dyestuffs are bluish-green to yellow-green and possess generally a great brilliancy and an extraordinary fastness to light.

As sulfonating agents one can use concentrated sulfuric acid, sulfuric acid monohydrate, fuming sulfuric acid of various concentrations, chlorosulphonic acid and mixtures of these agents alone or in presence of dilating and suspending media, such as dichlorobenzene, nitrobenzene, tetrachloroethane and the like. The temperature, at which the sulfonation is carried out, can be varied within wide limits, whereby according to the constitution of the starting product used the operation can be carried out at a temperature ranging from 0° C. up to 150° C., the time of the sulfonation depending upon the concentration of the sulphonating agents used and upon the temperature.

The thio-ethers of the phthalocyanines that are used according to my invention, contain one or several aromatic thio-ether groups and preferably 2 to 6 of such groups; the phthalocyanine ring and the thio-ether groups may carry further substituents, if desired.

The thio-ethers I use can be free from or can contain metals and more particularly heavy metals, like copper, nickel, cobalt, zinc, iron, chromium, lead and also aluminium, which metals are linked to the phthalocyanine ring as central atoms. The thio-ether groups can derive from benzene or from polycyclic aromatic ring systems, like those of naphthalene, tetrahydronaphthalene, diphenyl and the like. Moreover, the rings can contain further substituents. As such aromatic thio-ether radicals may be mentioned for instance the radicals of thiophenol, p-, m- or o-thiocresol, mono- and polyhalogenothiophenols, α- and β-thionaphthol or -tetrahydrothionaphthol and their substitution products.

It is also possible to use phthalocyanine derivatives containing different thio-ether radicals in their molecule.

The following examples, without being limitative, illustrate the present invention, the parts being by weight.

Example 1

10 parts of the condensation product obtained from a chlorocopper-phthalocyanine (containing 18% of chlorine) and thiophenol obtainable according to Example 1 of U. S. Patent No. 2,456,274, are dissolved in 50 parts of sulfuric acid monohydrate and stirred at 50° C. until a test shows that the product is easily water-soluble. The sulfonation mass is then cooled down and poured into a mixture of ice and a diluted sodium chloride solution. The dyestuff thus precipitated is filtered and can be washed with a diluted sodium chloride solution, or it can be suspended in a diluted sodium chloride solution, neutralized and filtered. After drying a dark powder will be obtained that is soluble in water with a brilliant green coloration and dyes paper, cotton and silk in very fast brilliant green shades.

Instead of sulfuric acid monohydrate one can also use 96% sulfuric acid or diluted fuming sulphuric acid or chlorosulphonic acid. The sulphonation can also be carried out at a lower or higher temperature, whereby the time of the sulfonation must correspondingly be modified.

Example 2

10 parts of symmetrical tetra-p-thiocresoxy-copper-phthalocyanine, obtainable for instance according to Example 2 of U. S. Patent No. 2,456,274, are dissolved in 40 parts of sulfuric acid monohydrate and treated with 10 parts of 28% fuming sulfuric acid. The mixture is stirred at 30–40° C., until a test shows that the product is easily soluble in water with a green coloration. The dyestuff is precipitated by pouring the sulphonation mass into water or into a mixture of ice and water, or into a sodium chloride solution and ice, or a sodium chloride solution, and worked up in the usual manner. It dyes paper, silk and cotton in brilliant green shades of very good fastness to light.

Instead of tetra-p-thiocresoxy-copper-phthalocyanine, one can use the metal-free compound or compounds with other metals as central atom, like tetra-p-thiocresoxy-nickel-phthalocyanine, tetra-p-thiocresoxy-cobalt-phthalocyanine, tetra-thio-p-cresoxy-iron-phthalocyanine and the like.

Example 3

10 parts of symmetrical tetrathiophenoxy-copper-phthalocyanine, obtainable example according to Example 6 of U. S. Patent No. 2,456,274, are dissolved in 50 parts of sulphuric acid (95–100%) and stirred at 30–40° C., until a test specimen is easily soluble in water with a green coloration. The dyestuff, when isolated in the usual manner, dyes paper, cotton and silk in brilliant green shades, having very good fastness to light.

The sulfonation can also be carried out for example at 80° C.

Example 4

10 parts of symmetrical tetra-p-thiocresoxy-nickel-phthalocyanine obtainable for instance according to Example 7 of U. S. Patent No. 2,456,274, are dissolved in 50 parts of sulphuric acid monohydrate and treated with 30 parts of 28% fuming sulfuric acid. The mixture is stirred at 20–40° C. until a test shows that the product is easily soluble in water. The dyestuff is then isolated in the usual manner, whereupon it dyes paper, cotton and silk in brilliant green shades.

Example 5

10 parts of dichlorodi-p-thiocresoxy-copper-phthalo-cyanine obtainable for instance from tetrachloro-copper-phthalocyanine and 2 mols of p-thiocresol according to the process described in U. S. Patent No. 2,456,274 are dissolved in 50 parts of sulphuric acid monohydrate and treated with 30 parts of fuming 28% sulphuric acid. The sulfonation mass is stirred at 40°–60° C., until the sulfonation has finished. The dyestuff thus obtained dyes paper in bluish-green shades.

Instead of the dichlorodi-p-thiocresoxy-copper-phthalocyanine one can use for instance di-chloro-dithiophenoxy-copper-phthalocyanine or dibromodi-p-thiocresoxy- or -phenoxy-copper-phthalocyanine, whereby similar dyestuffs will be obtained.

In the case, where monochlortri-p-thiocresoxy-copper-phthalocyanine is used as starting material a greener dyestuff will be obtained, whereas trichloro-monothiophenoxy-copper - phthalocyanine gives a bluer dyestuff.

Example 6

10 parts of octo-p-thiocresoxy-copper-phthalocyanine are dissolved in 60 parts of sulphuric acid monohydrate and stirred at 30–40° C. until a test shows that it is easily soluble in water. The dyestuff isolated in the usual manner dyes paper in yellowish-green shades.

Example 7

10 parts of symmetrical tetrathionaphthoxy-copper-phthalocyanine obtainable from tetrachloro-copper-phthalocyanine and β-thionaphthol are dissolved in 50 parts of sulfuric acid monohydrate and stirred at 20–40° C., until a test shows that the product is easily soluble in water. The dyestuff thus obtained is isolated in the usual manner and then dyes paper in yellowish-green shades.

Example 8

10 parts of dichlorohexathiophenoxy-copper-phthalocyanine are dissolved in 60 parts of sulfuric acid monohydrate and sulfonated at 30–40° C. The dyestuff thus obtained dyes paper in yellowish green shades. If one uses, as starting material, tetrachlortetra-p-thiocresoxy-copper-phthalocyanine, a dyestuff will be obtained that dyes paper in more bluish shades.

Example 9

10 parts of symmetrical tetrathiophenoxy-copper-phthalocyanine are suspended in 120 parts of dichlorobenzene and treated with 5 parts of chlorosulfonic acid. The charge is heated on the water-bath until the sulfonation is complete and a test shows that the product is easily water soluble. The chlorobenzene is then distilled off with water-steam and the dyestuff isolated by precipitating it with sodium chloride. The dyestuff dyes paper, cotton and silk in beautiful green shades.

Instead of dichlorobenzene one can also use other dispersing agents and the reaction temperature can be varied within wide limits.

Example 10

10 parts of symmetrical tetra-p-thiocresoxy-iron-phthalocyanine are dissolved in 60 parts of sulfuric acid of 95–100% strength and stirred at 70–120° C. until the sulfonation is finished. The dyestuff isolated in the usual manner dyes paper in grey-greenish shades.

Example 11

10 parts of symmetrical tetra-(5,6,7,8-tetrahydro-2-thionaphthoxy)-copper-phthalocyanine obtainable from symmetrical tetrachloro-copper-phthalocyanine and 5,6,7,8-tetrahydro-2-thionaphthol (2-tetralylthiol) according to the process of U. S. Patent No. 2,456,274, are dissolved in 60 parts of sulfuric acid monohydrate and stirred at 80–100° C. until a test specimen is easily soluble in water. The dyestuff isolated in the usual manner is, in dry state, a dark powder, dyeing paper in green shades of excellent fastness to light.

What I claim is:

1. A process for the manufacture of water-soluble dyestuffs of the phthalocyanine series, comprising the step of sulfonating an arylthioether of a phthalocyanine.

2. A process for the manufacture of water-soluble dyestuffs of the phthalocyanine series, comprising the step of sulfonating an arylthioether of a metallized phthalocyanine.

3. A process for the manufacture of water-soluble dyestuffs of the phthalocyanine series, comprising the step of sulphonating an arylthioether of a copper-phthalocyanine.

4. A process for the manufacture of a new water-soluble dyestuff of the phthalocyanine series, comprising the step of sulphonating symmetrical tetrathiophenoxy-copper-phthalocyanine.

5. A process for the manufacture of a new water-soluble dyestuff of the phthalocyanine series, comprising the step of sulphonating symmetrical tetra-p-thiocresoxy-copper-phthalocyanine.

6. A process for the manufacture of a new water-soluble dyestuff of the phthalocyanine series, comprising the step of sulphonating symmetrical tetrathionaphthoxy-copper-phthalocyanine.

7. As new articles of manufacture the sulphonated arylthioethers of phthalocyanines, which are soluble in water with a blue-greenish to yellow-greenish coloration and which dye cellulosic fibres in green shades fast to light.

8. As new articles of manufacture the sulphonated arylthioethers of metallized phthalocyanines, which are soluble in water with a blue-greenish to yellow-greenish coloration and which dye cellulosic fibres in green shades fast to light.

9. As new articles of manufacture the sulphonated arylthioethers of copper-phthalocyanines, which are soluble in water with a blue-greenish to yellow-greenish coloration and which dye cellulosic fibres in green shades fast to light.

10. As a new article of manufacture the sulphonated symmetrical tetrathiophenoxy-copper-phthalocyanine.

11. As a new article of manufacture the sulphonated symmetrical tetra-p-thiocresoxy-copper-phthalocyanine.

12. As a new article of manufacture the sulphonated symmetrical tetrathionaphthoxy-copper-phthalocyanine.

ERNST GUTZWILLER.

REFERENCES CITED

The following references are of record in the file of this patent:

UNITED STATES PATENTS

| Number | Name | Date |
|---|---|---|
| 2,135,633 | Bienert et al. | Nov. 8, 1938 |
| 2,285,359 | Rosch et al. | June 2, 1942 |

FOREIGN PATENTS

| Number | Country | Date |
|---|---|---|
| 492,177 | Great Britain | Sept. 15, 1938 |
| 203,432 | Switzerland | June 16, 1939 |

OTHER REFERENCES

Mullins, "Acetate Silk and Its Dyes" (1927), page 110. (Copy in Div. 43.)